«12» United States Patent
Aegerter

(10) Patent No.: US 7,877,682 B2
(45) Date of Patent: Jan. 25, 2011

(54) MODULAR DISTRIBUTED MOBILE DATA APPLICATIONS

(76) Inventor: William Charles Aegerter, 2234 NE. 9th Ave., Portland, OR (US) 97212

( * ) Notice: Subject to any disclaimer, the term of this patent is extended or adjusted under 35 U.S.C. 154(b) by 858 days.

(21) Appl. No.: 11/734,182

(22) Filed: Apr. 11, 2007

(65) Prior Publication Data

US 2007/0220089 A1    Sep. 20, 2007

Related U.S. Application Data

(62) Division of application No. 10/006,200, filed on Dec. 4, 2001, now abandoned.

(60) Provisional application No. 60/251,285, filed on Dec. 4, 2000.

(51) Int. Cl.
*G06F 17/00* (2006.01)
(52) U.S. Cl. ...................................... 715/237; 715/239
(58) Field of Classification Search ......... 715/234–239, 715/200
See application file for complete search history.

(56) References Cited

U.S. PATENT DOCUMENTS 7,650,432 B2 * 1/2010 Bosworth et al. ........... 709/248
2001/0037404 A1 * 11/2001 Hafsteinsson et al. ....... 709/246

\* cited by examiner

*Primary Examiner*—Stephen S Hong
*Assistant Examiner*—Manglesh M Patel
(74) *Attorney, Agent, or Firm*—Kory D. Christensen; Stoel Rives LLP

(57) ABSTRACT

Computer-implemented system and methods for deploying a distributed client-server system, enabling developers to rapidly create and deploy read-write distributed data interfaces for host database systems. The disclosed system is especially advantageous for mobile clients as connection to the server environment can be intermittent without unduly impeding local (disconnected) operations. One important aspect of the invention is an incremental process for executing an application servo in a client device. This process includes building and incrementally maintaining a logical context tree in which each node expresses a complete current state of the execution process.

21 Claims, 7 Drawing Sheets

(PRIOR ART)

Servo Template
```
400  <xsl:template match='wh:obj'>
402    <html:div>
404      <html:span> <xsl:value-of select='@barId'/> </html:span>
406      <ts:edit select='wh:desc'/>
408      <ts:expandable>
410        <ts:hideable>
412          <xsl:apply-templates select='key("objByLast", @wh:barId)'/>
414        </ts:hideable>
416      </ts:expandable>
418    </html:div>
419  </xsl:template>
```

Fig. 4A

Database Fragment
```
420  <wh:objects>
422    <wh:obj wh:barId='271'>
424      <wh:desc> black metal cabinet </wh:desc>
426    </wh:obj>
428    <wh:obj wh:barId='259' wh:last='271'>
430      <wh:desc> top shelf </wh:desc>
432    </wh:obj>
434  </wh:objects>
```

Fig. 4B

Interpretation multi-tree

Geometric Layout

Figure 6
Context Node

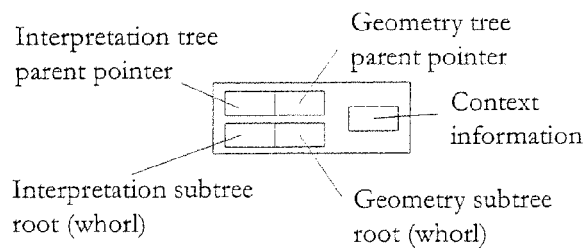

Interpretation tree parent pointer

Geometry tree parent pointer

Context information

Interpretation subtree root (whorl)

Geometry subtree root (whorl)

Figure 7
Interior Socket

Sum of number of context node children, transitive over interior whorls, but not beyond the first level of context nodes

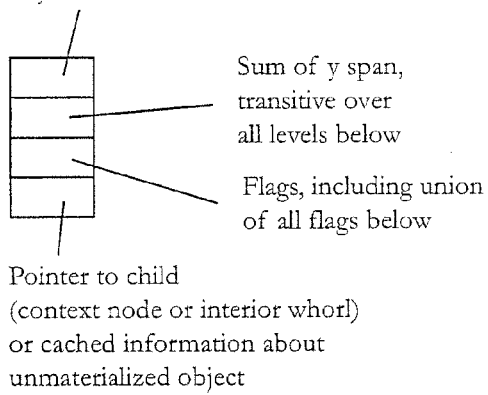

Sum of y span, transitive over all levels below

Flags, including union of all flags below

Pointer to child (context node or interior whorl) or cached information about unmaterialized object

Figure 8
Interior Whorl

Parent pointer to parent interior whorl or parent context node containing the whorl referencing this

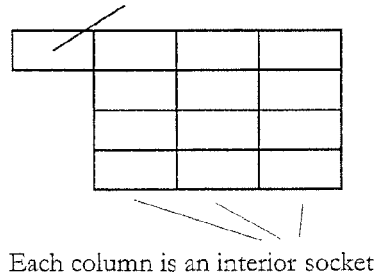

Each column is an interior socket

Sparse relative multi-b-tree

Detail of context tree

MODULAR DISTRIBUTED MOBILE DATA APPLICATIONS

RELATED APPLICATIONS

This application is a divisional of U.S. patent application Ser. No. 10/006,200, filed Dec. 4, 2001, which claims the benefit of U.S. Provisional Application No. 60/251,285 filed Dec. 4, 2000, both of which are incorporated herein by reference.

COPYRIGHT NOTICE

© 2001 ThinkShare Corporation. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

The present invention relates to software systems for distributed mobile computing and, more specifically, it includes a software platform—and application language—for deployment of portable, reusable, and interoperable data viewing and modification applications in a distributed, intermittently networked environment.

BACKGROUND OF THE INVENTION

Increasing numbers of workers are mobile, meaning that they do their jobs outside of the conventional office. Laptop and palm-sized computers provide some communication and computing ability "on the road" and, with the decreasing size of data storage devices of all types, mobile workers can carry a lot of data with them. It is more difficult, however, to share data with others or access a centralized database. Specifically, mobile users (or developers of wireless data systems) face several challenges, such as:

Disconnected operation. Workers often lose connectivity in certain areas such as, subways, buildings, etc. but they should be able to continue doing their job and, at a minimum, not have their data corrupted (either locally or centrally) as a result of the disconnection.

Limited screen size and user input. It is difficult to display large amounts of information, and enable a user to meaningfully "browse" the information on a tiny screen. User input is limited as well, especially with respect to PDAs and cellular phones.

Latency. Another challenge facing developers is how to design applications that make best use of a range of bandwidths.

Manageability. Applications should be able to grow, adding features and functions, without rebuilding them from scratch and without losing backward compatibility with other programs or services.

The value of separation of data and format has become widely known, one example being the use of stylesheets as described in U.S. Pat. No. 5,860,073. Stylesheets alone, however, do not adequately address the mobile user problems outlined above. For example, a stylesheet or transformer can be written to translate data to HTML or WML for display on a small screen. But if the result is long, downloading may take awhile, and even if communication bandwidth is good, disconnection is a risk, and even after downloading, limited local processing power may result in long delay before the entire document can be randomly accessed by the user. Stylesheets enable some dynamic properties, but when applied in the context of a Web browser page viewing they do not provide a complete solution for disconnected operation.

XML (eXtensible Markup Language) is a known document processing standard (a simplified form of SGML). It allows a developer to create a custom vocabulary or "schema" defining a custom markup language. This can be done using a document type definition (DTD) or with the XML Schema Definition (XSD), among other schema languages. The schema specifies what elements or tags and attributes can be used in a document and how they relate to each other. Many industry-specific DTDs are evolving, for example MathML, PGML, etc. XML parsers are publicly available for checking "well-formedness" of a document (compliance with the XML syntax specifications) as well as "validity" meaning compliance with the applicable schema.

The Information and Context Exchange (ICE) protocol is designed to manage establishing "syndication" relationships and data transfer for content distribution. ICE is an application of XML. ICE enables establishing and managing syndicator-subscriber relationships for transferring content that is generally originated by the syndicator and consumed by the subscriber, such as news or weather reports. This system essentially supports one-way distribution of content, i.e., publication, rather than interactive, mobile applications implementing and synchronizing distributed databases. Still, it does suggest a data replication scheme mediated by XML messages.

It has also been suggested to use text-based descriptive attribute grammar, like XML, to specify object-oriented applications. U.S. Pat. No. 6,083,276 to Davidson et al. describes such a method. It is limited, however, to essentially translating the application description (in an XML-like language) to a set of software objects such as Java® component classes. Each element declaration in the source (markup language) file must be capable of being mapped to a corresponding application component class. Each element with children must result in a corresponding container component with analogous child components. Every attribute declaration must map to a corresponding property value in the corresponding component, and so on. Thus the application must be designed from the outset to align very closely with a selected object-oriented language and framework. Desired extensibility, reuse and similar goals are sacrificed, although the concept of initially describing an application using an XML-like syntax is interesting and has some obvious benefits. The '276 patent to Davidson, however, primarily teaches an automated method for translating that description into a specific object-oriented program at which point the benefits of the descriptive attribute grammar are lost.

U.S. Pat. No. 6,012,098 teaches a system for isolating the retrieval of data from the rendering of that data. A data retrieval "servlet" executes a query, and converts the results to an XML data stream, delivered to a downstream rendering servlet. The rendering servlet parses this XML data stream, using a stylesheet that may be written using XSL, and creates an HTML data stream as output for communication to a client computer.

XSLT, or Extensible Stylesheet Language—Transformation, is a useful tool for working with XML documents. XSLT enables one to extract and transform the source information in various ways, for example into another markup language like HTML as is commonly done. See FIG. 1.

Many software systems exist which implement or utilize the XML family of standards (XML, XSL, XPath, XML Schema Definitions, etc.). HTML and XML browsers are common. Many enable offline operation by accessing cached read-only data. HTML and XML editors are common as well, all of which form part of the general background of the invention.

See also U.S. Pat. No. 6,167,409 to DeRose et al. "Computer System and Method for Customizing Context Information Sent with Document Fragments Across a Computer Network."

Glossary of Prior Art Terms and Acronyms

Application server—One of a class of commercially available software frameworks for integrating computation into a web server environment.

Load-balancing router—A router that takes into account the effective performance of a set of computational resources when deciding where to route a message.

N-tier architecture—A software architecture in which computing resources can be layered to any depth. In contrast to "3-tier architecture."

Namespace name (Namespaces)—A URI uniquely identifying a namespace. See Namespaces in XML [Namespaces].

Public identifier (SGML)—Globally unique string to identify a resource. Could be accompanied by a system identifier, which was often a filesystem path on a private filesystem.

Public identifier (XML)—Unique identity string. See XML 1.0 [XML].

Self identity—Identity as self-assigned by an object, without the direct assistance of an issuing authority. The UUID is a standard created to support the implementation of self identity. Self identity is needed in situations where it is not necessarily possible or appropriate to request an identity from an authority.

Session—An object representing a cached state to optimize an end user's interaction with the system.

Synchronization point—The event during which a database incorporates information from another database, thus instigating replication or updating previously replicated information.

Unique identifier—Any identifier that defines a set of rules, that, if followed, guarantee uniqueness.

XML Extensible Markup Language—A simplified form of SGML, the Standard Generalized Markup Language, in international documentation standard. XML is a document processing standard recommended by the World Wide Web Consortium (W3C).

XSL Extensible Stylesheet Language—A part of the broader XML specification. An XSL document or stylesheet transforms an XML input document to an output document, essentially applying element formatting rules.

XSLT Extensible Stylesheet Language—Transformation—The transform portion of the broader XSL language specification.

XPATH—A syntax for describing a node set location in an XML document using expressions that consider the context in which they appear.

URI—Uniform Resource Identifier. See RFC2396 [URI].

UUID—Universally Unique Identifier. A 128-bit unique identifier that can be allocated without reference to a central authority. From Universal Unique Identifier [DCE].

SUMMARY OF THE INVENTION

The present invention includes computer-implemented methods for modular programming on distributed devices that brings together and extends industry standards in a unique way to create a platform for a class of portable, reusable, and interoperable data viewing and modification programs that can operate in a distributed, occasionally communicating environment, for example where client devices are loosely linked to hosts or servers via a wireless communications channel. The invention builds on XML and related standards, including, but not limited to, Namespaces in XML, XPath, XSL, XSLT, XPointer, XLink, XHTML and XML Schema Definitions [XSD].

A complete distributed programming model is achieved by enabling declarations of shared or private data storage, declarations of schema translation, synchronization rules, editing actions, access rules, application packaging, label sets for default interfaces, and registration for distribution and reuse. The invention exploits schema to enable seamless integration at both data and display levels. An application defined for the invention can extend another one dynamically, even if neither developer was aware of the other application.

Thus, one important aspect of the invention is a computer-implemented, incremental process for executing an application servo in a client device. This process includes building a context tree in which each node expresses (by reference) a complete current state of the execution process. For example, the context node content includes a pointer to an element in the servo execution of which spawned the context node; a pointer that identifies a current data context by pointing into a source tree; a reference to a parent context; and an ordered, potentially sparse, list of pointers to zero or more child contexts.

Another feature of the incremental execution calls for the creation of child spacer nodes in the context tree representing unmaterialized child contexts. These can be used for certain operations, and estimates, without waiting for evaluation of the entire source tree. In a presently preferred embodiment, the context tree is implemented using a relative b-tree structure, and each spacer is reflected in an interior node entry in the relative b-tree structure to facilitate searching unmaterialized contexts.

Another aspect of the invention is a servo definition language for defining a distributed application that supports disconnected operation. The language typically includes the following types of rules: application data schema; transformation rules; transaction handling rules; and interface object specifications. Importantly, the servo definition language can also implement opportunity rules to realize automatic extension or integration of servos through opportunity-based linking of an interface component representing an instance of a schema fragment to a template.

The invention enables developers to rapidly create and deploy read-write distributed data interfaces for systems that employ relational databases or have XML interfaces. Even when wireless network service is available, efficient use of the network is important for the end-user and/or the service provider (depending on the pricing structure of the service contract). The invention addresses this by allowing many actions to be taken without immediate use of the network.

Wireless service is unreliable and often unavailable (e.g., in basements, rural areas, and commercial aircraft). While it is not possible to access new information when service is not available, the invention makes it possible to review recent actions and initiate new actions of common types. Further, the present invention enables the development of continuously evolving suites of applications by maintaining integration with legacy "servos" as new servos are created and deployed. Users need not be actively involved in the distribution process. Developers can focus their efforts on individual capabilities rather than frequent systemic overhauls. "Servos" as used herein, roughly analogous to applications, are more precisely defined later.

Additional aspects and advantages of this invention will be apparent from the following detailed description of preferred embodiments thereof, which proceeds with reference to the accompanying drawings.

BRIEF DESCRIPTION OF THE DRAWINGS

FIG. 4A is a code fragment from the asset management servo of Appendix B.

FIG. 4B is sample data in the schema of the asset management servo.

FIG. 6 is an illustration of a context node for use in incremental processing of a servo.

FIG. 7 is an illustration of an interior socket for use in forming a relative b-tree structure.

FIG. 8 is an illustration of an interior whorl for use in forming a relative b-tree structure.

Figure 1:
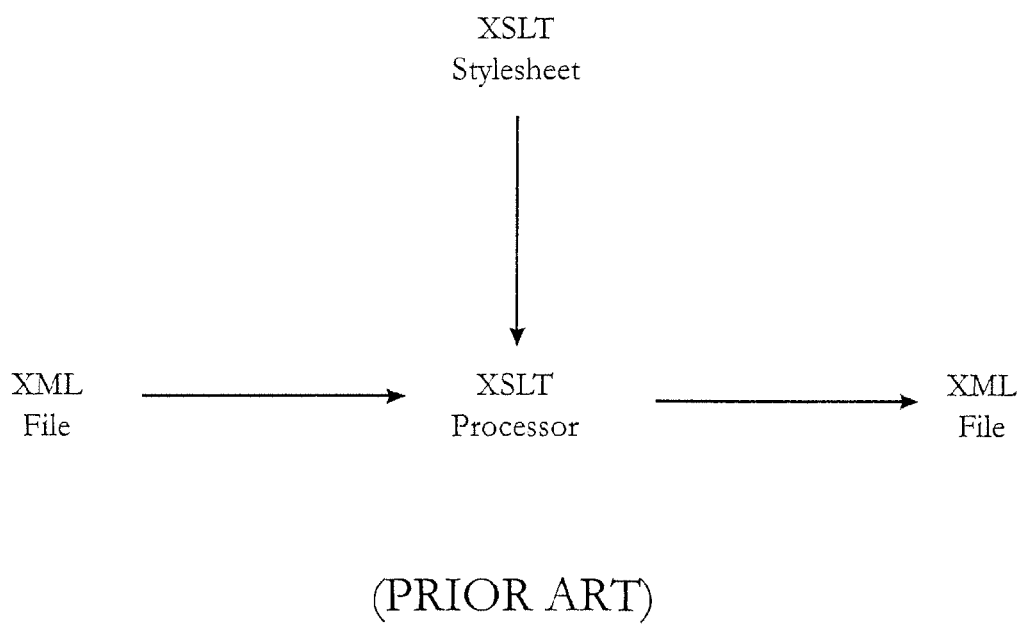
FIG. 1 is a simplified data flow diagram illustrating a common batch XSLT transformation process as known in prior art.

Appendix A is a listing of a software description language (SDL) schema consistent with the present invention.

Appendix B is a sample asset management servo expressed in the SDL of Appendix A.

DETAILED DESCRIPTION OF PREFERRED EMBODIMENTS

The following terms are used in the present description of the invention. Some terms are described in this glossary only, while others are explained in more detail below. It is provided here as a convenient reference for the reader.

Abstract interface object—An object that provides information to an end-user or other software component. An object that offers the ability for an end-user or other software component to provide information to the software system, such as enabling a choice or providing information in answer to a particular question.

Concrete interface object—An interface object representing a specific interface component that interacts with a human or another software component. For example, a graphical user interface widget such as a drop down list.

Context, interpreter—An object which encodes, through its own data and the objects it references, the internal state of the interpreter at a specific point of evaluation. This is explained in detail below. Computing server—A server used to run servos and reconcile with backing stores and other datasources.

Database name—A string that can be used within one specific database as a short handle to another specific database.

Datasource—An information resource that implements the datasource protocol. Datasources may include resident databases managed by the invention, specific computational resources (such as applications written using other technologies), or gateways to other Internet resources.

Datasource declaration—The means of specifying the existence and addressability of a datasource. Datasources are commonly registered with the registrar.

Datasource protocol—A specific protocol for accessing information resources. SOAP [SOAP] is an example of a datasource protocol.

Default servo—A servo associated by the registrar with a schema to be used in the event that a user encounters data in that schema and has not previously selected an application to use with that schema. Each schema has at least one default application. Different servos may be associated with different element and attribute declarations.

Directory services—A location broker that provides a navigable index of available services.

Front-end server—One or more functionally equivalent servers used to process incoming requests and route them to appropriate computational resources using knowledge about the specific request (the content of the packet). A front-end server(s) may be a component of a load-balancing router.

Incident reporting service—A service which tracks subscriptions to events associated with particular resources, and informs subscribers when those events occur. Used most commonly to track dependencies between source databases and databases that replicate parts of the source databases.

Label—One or more strings or other objects such as sound or images associated with an element, attribute, model group or other component of schema that serve to provide identifying information for use in a user interface.

Location broker—A component of the invention that can accept an identifier for a resource and provide means to contact that resource. Resources are not necessarily local to the broker.

Opportunity—An association between a unit of schema and a view or other action that can provide a means to interact with, modify, or apply an operation to, an instance of that same schema.

Public identifier—The public identifier used by the invention. An instance from a managed URL space. Compatible by subset with public identifier (SGML), public identifier (XML), URI, namespace name, unique identifier.

Public identity—Identity as known to a central authority that issues unique identifiers. (For the invention, the authority is the registrar and the identifier is the invention public identifier.)

Registrar—The system resource which manages the registration of schema, applications and datasources. The registrar enables reliable identification and data mappings as further described below.

Schema translator—A software component that converts data of one specific schema to data of another specific schema.

Servo—The unit of application packaging provided by the invention.

Servo definition language (SDL)—A language in which servos are expressed.

Servo transition—The action in which use of one application naturally leads to use of another by leveraging the common schema of the underlying data.

Short identifier—Another term for database name.

Storage declaration—Declaration of a persistent storage tree. See below.

Synchronizer—A component of the invention which uses transaction definitions, synchronization point identifiers, time stamps, datasource declarations and database instance-specific parameters to maintain correct database state across a set of related databases managed by the invention. Also called transaction engine.

System identifier—An instance of a UUID used as a form of self identity for resources such as databases.

Task allocator—A service that assigns interactive tasks to available computational resources based on suitability to purpose (server load, access to resources, availability of cached database or session state).

Task scheduler—A component of the invention that assigns computational tasks to available computational resources based on priority, aging, deadlines, load, etc. Typically the tasks handled in this manner are not in response to a current user request.

Transaction engine—Another term for the synchronizer.

View—A grouping of transformation rules and components that define all or part of the interface for a servo.

View declaration—Declaration of view—View declarations define how the application (servo) interacts with the user or another software component.

Introduction to Servos

We refer to an application in accordance with this invention as a servo. More specifically, a servo is the unit of application packaging provided by the invention. A servo is created by "declaring" it in accordance with an appropriate servo declaration language. In accordance with a presently preferred embodiment of the invention, an XML-based Servo Declaration Language (SDL) is provided, portions of which are attached as Appendix "A." Those skilled in the art will recognize that other SDLs along similar lines may be used within the scope of the present invention. Key aspects of the SDL will be described in detail below. In practice, a developer specifies (or references) an appropriate schema in the SDL and then specifies (declares) a desired application, or servo, consistent with that schema. The schema definition language may use a markup language-like syntax, such as XML. A sample servo, discussed in detail later, is shown in Appendix "B." Another important aspect of the present invention is an incremental process for interpreting or executing an application servo in a client device (or a server). This process is described in detail later.

All other things being equal, the less information the author of a software application needs to provide, the less time the author will need to spend to create and maintain the application. The present invention provides a concise way to declare distributed data management applications. The experience provided to the end-users is created by selectively combining servos, which may be created by different authors, and interpreting them on differing platforms. This process is assisted by keeping the quantity of specification provided by the developer to a minimum. Platform independence is achieved through a minimal platform independent application definition, supplemented by platform specific transformations where the defaults are not adequate to address the goals of the application author.

As noted above, the present servo definition language (SDL) is an XML-based language in which servos are expressed. The XSL vocabulary is referenced by the SDL schema. This enables developers who are familiar with XSL to make use of their experience and allows some of the experience gained developing servos to be used in other contexts.

Information about a particular session environment can be made available (subject to security restrictions) for reference by SDL through a specially named input tree. Session environment information can include, but is not limited to, the physical location of the mobile user, identification of client hardware, quantification of available resources, and status of communication channel.

Figure 2:
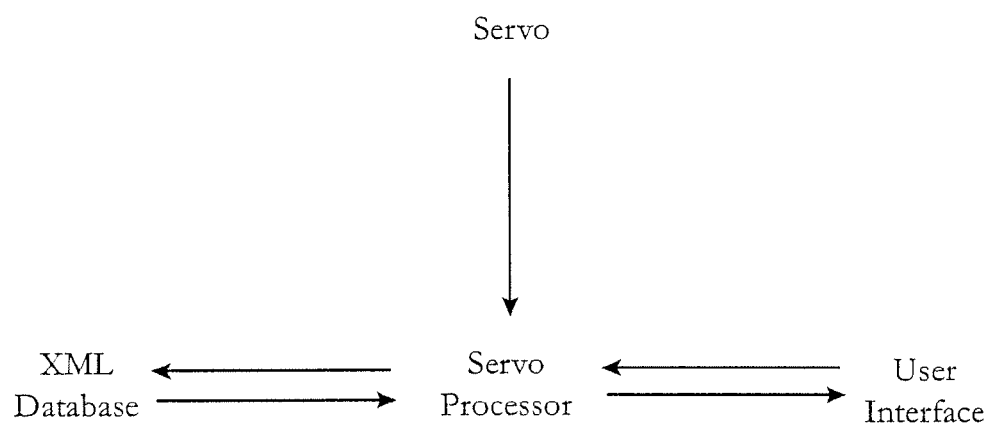
FIG. 2 is a simplified data flow diagram illustrating interactive servo execution in accordance with the present invention.

Application data is available (subject to security restrictions) for reference in SDL as individually named input trees, using the names from storage declarations further described below. These stores can be referenced as variables. Each characteristic of a servo preferably may be identified as overridable or not. This enables or disables user-specific customization. A simplified diagram of data flow is shown in FIG. 2.

Consistent with a presently preferred embodiment, servos, data, and protocol (including queries and query results) are all represented in XML. For any computational task, the inputs, the outputs, and the instructions preferably are all expressed using XML. Since XML is simple and compact to transport, this computational model makes it simple to deploy more hardware to handle loads. This includes the opportunity to utilize thousands of servers as well as the opportunity to move computation to "smart" (invention-enabled) clients when appropriate. It also provides the means to transparently shift the underlying database mechanisms to suit the different performance characteristics of different stores.

Further, the present invention can be said to implement "n-tier architecture"—a software architecture in which computing resources can be layered to any depth. The architecture allows independent information sources over a vast scale to be accessed through a single interface. Rich schema and interschema translation services enable information to flow across the layer boundaries without loss of context as further explained below.

Several specific features of a servo declaration are described in detail below. First, we provide some context by illustrating at a simplified high level an illustrative deployment of the invention, followed by a simple servo example. The sample office asset database application will then be used to illustrate incremental execution of servos and the execution context tree construct.

Illustrative Deployment

Figure 3:
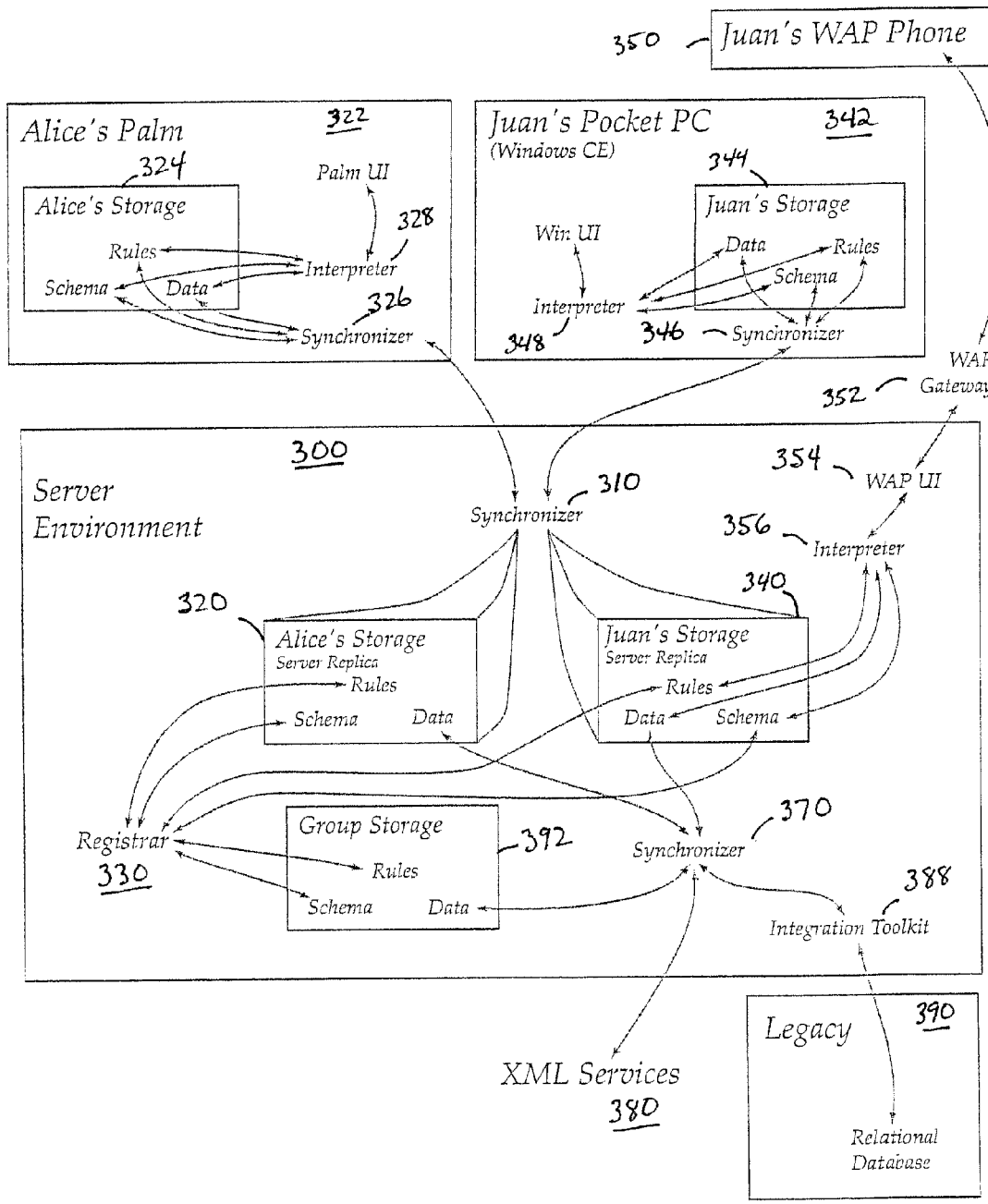
FIG. 3 is a simplified block diagram of a distributed system illustrating a deployment of the present invention in a wireless context.

In FIG. 3, a server environment 300 is shown as currently supporting two mobile users, Alice and Juan. A synchronizer component 310 communicates with a corresponding mobile synchronizer 326 on Alice's mobile unit, such as a Palm Pilot or other PDA 322. Similarly, Juan's pocket PC 342 includes a synchronizer component 346. Alice's PDA 322 includes local storage or data cache 324 where schema, rules (servos) and data are stored. A replica 320 of Alice's storage is shown on the server 300. In operation on Alice's PDA device, an interpreter 328 executes selected servos, interacting with data and with the PDA user interface. Data in the local storage 324 is synchronized with the replica data 320 on the server via the synchronizer components, as explained in detail later.

The local data cache provides the local storage for the synchronization engine described below. It facilitates the sharing of data across applications and provides support for disconnected operation. For example, an application managing purchase order information can integrate seamlessly with an application managing customer information, creating a unified view.

Another aspect of the local data cache is the ability to provide a unified interface to shared as well as personal data sources. Applications provide views that can join individual data, shared data, and group data. The synchronization engines on the client and the server manage all this data. The local data cache in a presently preferred embodiment includes indexing so as to enable efficient random access to local data.

Juan's pocket PC 324 similarly includes Juan's local storage 344, including data, schema and rules (servos). An interpreter 348 on Juan's pocket PC executes selected servos, interacting with locally stored data and the Microsoft Windows user interface, supported by the Windows CE® or similar operating system. As before, Juan's storage has a replica 340 on the server 300 with which the mobile unit is synchronized. The pocket PC is an example of a "rich client" that would typically include, in addition to the operating system software, a synchronization engine and a display engine.

The display engine's primary purpose is to translate interface object specifications onto the display of the wireless device, providing a layer of abstraction between the code and the device operating system. This component allows application developers to create applications that can run on multiple device-types in ways that optimize the user interface for each device.

Actions normally handled using multiple windows on a desktop computer, become possible using a single view on a small screen, enabling dissimilar applications to work together without modification. This important flexibility enables system developers to be more responsive than ever to the constantly changing needs of their clients.

The display engine features preferably include:
A unique class of concrete interface objects to assist users making selections from large databases.
The suite of standard device interface objects—tables, pick lists, buttons, etc.
A generic pop-up window supporting all UI and data types available on the platform described herein.
The ability to bind a UI element to a piece of data without needing to track changes backwards and forwards.

The transaction engine (or "synchronizer") 346 addresses the challenges facing users of wireless solutions when disconnection occurs. Traditionally, productivity grinds to a halt. Here, the transaction engine provides seamless operation— regardless of connected state—to the user, enabling continuous productivity. Additionally, this feature enables the user to work asynchronously, in other words, every user action does not require communication with the server. This significantly enhances application performance.

The synchronization engine preferably includes the following features:
Transactional support-store, forward, and full rollback with supporting UI components for handling related events.
Event synchronization control—a full suite of controls enabling developers to determine when and how synchronization occurs, including priority for individual transactions and classes of data.
Background updating—allows the server to push information to the client transparently.

Referring again to FIG. 3, Juan also has a WAP phone 350 that can communicate with the server 300 via a WAP Gateway 352. Another interpreter instance 356 is deployed in the server 300 to execute servos selected by Juan via the WAP phone, and interact with him via the WAP user interface 354. This illustrates a "thin client" deployment where the interpreter is deployed on the server rather than the client side. Wireless handheld data devices divide into two major categories: rich clients and thin clients. Rich clients have local storage capabilities as well as processing power. Thin clients essentially only have the ability to display data.

The present invention works for both environments. On rich clients, the client-side code resides on the device itself. On thin clients, the client code runs in the server environment as a virtual client and communicates with the device using available protocols. Offline functionality is not available with thin devices, but they access the data in the same manner. Nonetheless, the present architecture provides a consistent development environment for both types of clients by running the XML-based interpreter, XML storage interface, and synchronization protocols in a virtual client module residing on the server.

Server environment 300 also includes a registrar service 330 where each user's rules and schema are registered, as explained in greater detail later. The registrar is a component storing the user applications or "servos" as well as managing the deployment and updating of new versions. It also is where data schema are registered, enabling the seamless migration from one application version to the next and enabling a seamless mechanism for dynamically rolling out new functionality to client devices. This enables the developer to create a persistent richness of applications over time, and able to manage the multiple versions within an organization.

On the backside, the server environment is coupled to a legacy relational database 390, by virtue of an integration toolkit 388. Another synchronizer element 370 synchronizes data between the replica storage 320, 340 and the external database 390. The synchronizer 370 can also utilize other XML services 380. The server environment 300 further includes a group storage element 392 including schema, servos and data.

Finally, the server includes a server side synchronizer 310. The server synchronizer is the server's counterpart to the client synchronizer. Its main function is to speak not only to the clients, but also to the backend databases. The server synchronizer includes the following features in a presently preferred embodiment:
Client synchronization—provides synchronization services with a myriad of devices and handles data collision, store, forward, and roll-back.
Backup and restore of local client data—allows users to use any handheld device and still retain both personal settings and local cache.
Interface with backend database—handles the transactions with the backend databases ensure data integrity throughout the system.
Transactional services—manages changes in data and ensures data integrity between clients and servers in the event connectivity is lost during the transmission of data.

In operation, a typical life cycle of a request from a mobile unit is handled as follows. An incoming request first sees a load-balancing router that parcels requests out to front end servers. This is part of the "server environment" of FIG. 3. Once received by a front-end server, the URL is analyzed by a task allocator to determine an appropriate computational resource. The allocator uses a location broker to determine what servers are involved (responses may be cached for performance) and a performance monitor to assess the availability of the resources.

Once received by a computing server, the request is sent to an interpreter instance for decoding. If there is already an active instance for the user's session, a reference to it is obtained from the session object and the request is sent to that instance. If not, a new instance is created and the request is sent to the new interpreter instance. These objects are not shown in FIG. 3 as it is primarily a data flow diagram. At this point, further processing is dependent on the nature of the request.

We define a computing server as a server used to run servos and reconcile with backing stores and other datasources. An application server is one of a class of commercially available software frameworks for integrating computation into a web server environment. And a "session" as used herein refers to an object representing cached state so as to optimize an end user's interaction with the system. These objects are not shown in FIG. 3 as it is primarily a data flow diagram.

At this point, further processing is dependent on the nature of the request. If the request involves accessing data that resides in another database managed by the present system, a messaging service is used to post the request. The messaging service will use the location broker to determine where to send the message that has been addressed using a platform public identifier. Public identifiers in this context are URLs for resources assigned through the authority of the registrar.

If the request involves accessing information from an external HTML source, the process is similar to above, except that the object that receives the message is not a database, but an adapter that knows how to post an appropriate request (or set of requests) to the web and convert the result into XML. (Portably written adapters that do not rely on cached state can be run anywhere, so the messaging system can choose to resolve the request in the current address space.)

If the request involves accessing data local to the user's database that has been replicated from elsewhere, a synchronization log is checked to see if the database is within the grace period allowed by the declaration of the datasource. (These services are further described later.) If so, the replicated data is used without further investigation. If the database is out of date, a request is sent to the datasource directly using the messaging service. The datasource responds with the synchronization packets required to update the local database. The update is performed and then the original request is processed.

A Simple Servo Example: the Office Asset Database Application

FIG. 4A shows a simple example of a servo template which would typically appear as part of a servo declaration. FIG. 4B is a database fragment associated with the servo template of FIG. 4A. Each line of code in the drawing is numbered at the left side (400-419 in FIG. 4A, 420-434 in FIG. 4B). These numbers are provided for reference in this description, they are not part of a sample code. Referring now to FIG. 4A, the xsl:template declaration defines the corresponding fragment of data schema, in other words the associated data type, by reference to the "wh:obj" element. Line 402 borrows the standard html tag for defining a division of the output resulting from this execution. In line 404, the html:span element employs the xsl "value-of" instruction, generally used to generate output, with the attribute select='@barId'. This is the XPATH formulation to obtain value of the barId element of the database object. Referring to FIG. 4B, the first object in line 422 has the barId value equal to '271'. Consequently, execution of this servo will output the number 271 as illustrated in FIG. 5B.

Referring again to FIG. 4A, line 406 asserts an edit instruction from the "ts" schema, with a matching criterion ("select") of the description element ("desc") of the same database. ("ts" alludes to ThinkShare, assignee of the present application.) The edit instruction is defined in the schema of Appendix A. It provides for display of an editable field in the user interface. In this case, it operates on the description element of the database, which appears in FIG. 4B at line 424 having the string value "black metal cabinet." Accordingly, the string "black metal cabinet" is displayed on the user interface as shown in FIG. 5B.

The <ts:expandable> and <ts:hideable> elements are described in detail in Appendix "A". The remaining lines of code in FIG. 4A are merely closing tags.

Returning to FIG. 4B, a first object is described in lines 422-426 and second object is described in lines 428-432. The second object is shown at line 428 as having a barId attribute value of '259' and last attribute value of '271', the latter being a pointer to the previous object. The second element 259 has a description "top shelf" which is then displayed as shown in FIG. 5B, by virtue of the apply-templates instruction shown at line 412 of FIG. 4A. The xsl:apply-templates element selects a set of nodes in the input tree, and processes each of them individually by finding a matching template rule for that node. The set of nodes is determined the select attribute, as noted, which is an XPATH expression that returns a node set. The key used in this expression is a persistent one declared as part of the servo.

Figure 5A:
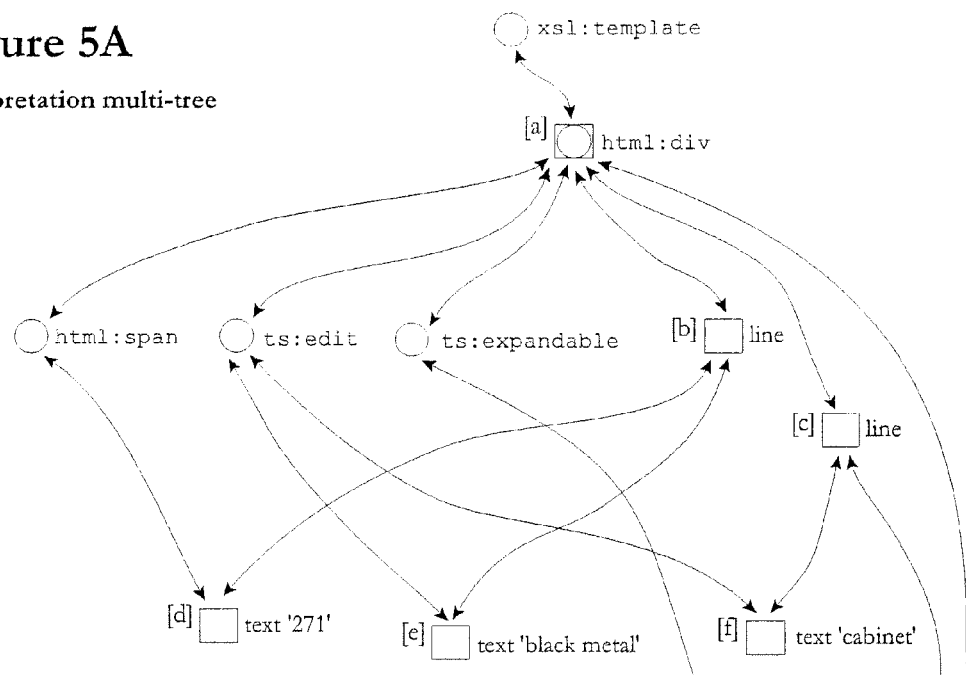
FIG. 5A is a multitree diagram illustrating execution of the servo template of FIG. 4A over the sample data of FIG. 4B.
Figure 5B:
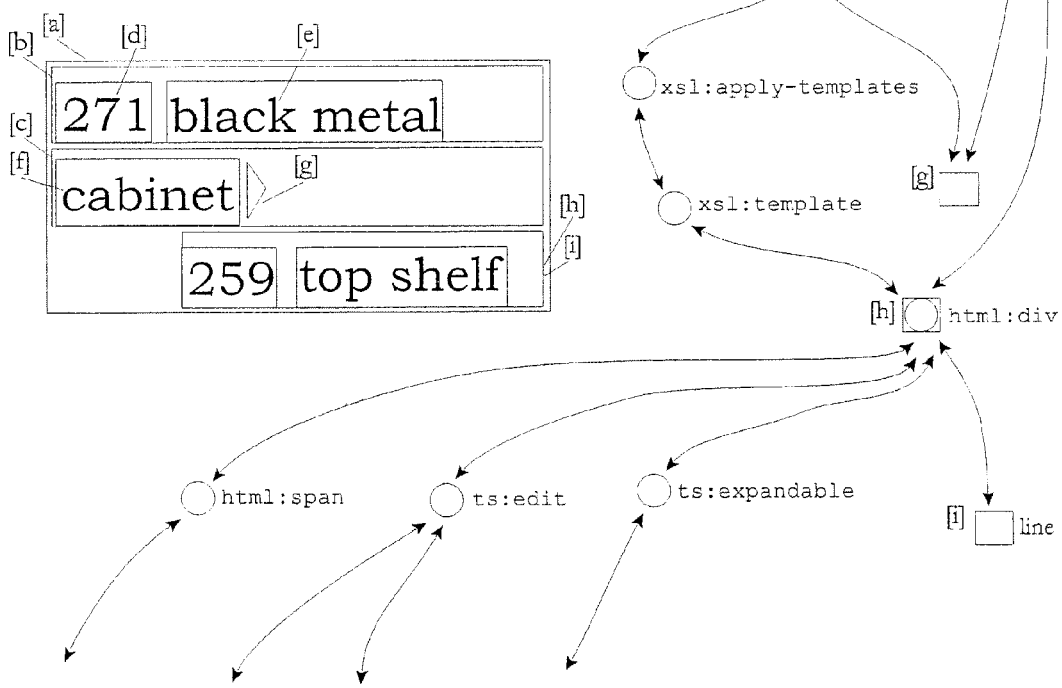
FIG. 5B is an illustration of a screen display generated by the servo template of FIG. 4A.

FIG. 5A is a portion of an interpretation multitree illustrating operation of the servo template of FIG. 5A on the database fragment of FIG. 4B. This is an abstraction of the context records created during the incremental process of executing an application servo. FIG. 5A includes essentially two related tree structures—the servo execution tree and the output or geometry tree. The execution tree comprises the circles, for example, the root node circle 500, while the geometry tree comprises the squares in FIG. 5A. With respect to the execution tree, each circle corresponds to a "context" which in turn reflects a specific state of the execution process. The tree begins at the root node 500 which identifies the template corresponding to FIG. 4A.

FIG. 6 is a simplified illustration of a single context node (corresponding to one of the small circles in FIG. 5A). Each context node includes an interpretation tree parent pointer, an interpretation tree root, a geometry tree parent pointer, geometry tree root pointer, and additional context information as described below. Later, we describe the use of "spacers" as a proxy for a plurality of unmaterialized context nodes, and a relative b-tree structure for encoding the interpreter context tree. First, we further explain important elements of the servo language.

Schema Declarations
    The principal types of declarations are:
    Schema
    Labels
    Abstract interface objects
    Storage declarations
    Concrete interface objects
    Abstract interface objects The currently preferred embodiment of the invention uses XML Schema Definitions as the core vocabulary for defining schemas. In principle, other means of specifying schema can be used. In addition, the invention provides enhancements, discussed later, which enhance the usefulness of schema in the context of the invention.

One such schema enhancement is called a "label." Here, a label is one or more strings or other objects such as sound or images associated with an element, attribute, model group or other component of schema that provides identifying information for use in a user interface.

Objects declarable as labels include, but are not limited to:
    strings representing natural language
    bitmap or vector graphics
    voice recordings
    other sounds, specified by any means
    Textual labels of various lengths and languages can be provided by a servo author using the example syntax provided in Appendix A. Shorter strings can be used as abbreviated labels, longer strings or element subtrees as descriptions or documentation providing user assistance. Labels are accessible to servo authors through an additional XPath axis or an element vocabulary within the schema axis. Labels are particularly useful for creating servos that must deal with a large number of different languages and/or schemata.

Additionally, certain abstract interface objects provided by the invention make use of labels to generate user interface objects based on the language context without need for explicit reference to labels via XPath. For example, the < > element in the sample syntax provided in Appendix A specifies a labeled editable field, without need to explicitly reference the label. Other abstract interface objects can make implicit use of labels, including, but not limited to:

tables with headings
tool bars containing icons representing actions
voice prompts Storage Declarations A storage declaration is the means by which a servo author reserves named persistent storage for use by the application and any other servos that may be authorized to access the data. Storage declarations define a locally scoped name for a persistent storage tree, and specify the schema to which the storage tree must comply. Note this refers to a data schema, not a servo declaration schema. An example of a storage declaration is shown in Appendix "B."

The lifetime of external data varies. Old stock quotes (complete with time stamps) have unlimited shelf life, but little utility to the individual who wants only the latest quote available. Weather forecasts may be updated several times a day, weather observations several times an hour. Personalized recommendations from a commerce site may not need to be updated more than a couple times a week. For these reasons, the author can declare the lifetime of data obtained from a given source. The lifetime may vary for different elements of the schema.

Collaborative datasources, such as a shared shopping list, may require a synchronization check each time they are accessed. The author declaring the storage can also declare the form of acceptable queries and the corresponding query results. An illustrative example of a storage declaration schema is shown within the schema of Appendix "A."

Specifying Concrete Interface Objects

A concrete interface object is an interface object representing a specific object which interacts with a human or another software component. Some representative concrete interface objects include, but are not limited to:

1. an editable text field
2. a voice prompt answerable with a voice response
3. an XML message sent to another subsystem, answerable by an XML response message
4. a one-of-n choice presented as radio buttons in a graphical user interface
5. a one-of-n choice represented as a pull-down or pop-up menu in a graphical user interface
6. a one-of-n choice presented as voice prompt offering choices that can be made by typing keys on a telephone or other device
7. a paragraph element ("p") in XHTML
8. an XSL formatting object A graphical user interface specified by the invention can use elements from a number of vocabularies, including XHTML, XSL. In particular, the common user interface elements, including, but not limited to forms, buttons, menus, editable fields and tables may be specified using any number of vocabularies. In addition to common graphical user interface objects, the invention provides for use of concrete interface elements that provide structural views of information. For example, the invention provides concrete interface objects that expand to display additional concrete interface objects in response to user commands. These devices are particularly useful when combined with opportunities, described below. The combination of these interface devices with the method of "view declaration" provides particular advantage to users of handheld devices with small displays.

Specifying Abstract Interface Objects

Recall that an abstract interface object is an object that provides information to an end-user or other software component. An abstract interface object can be used to enable an end-user or other software component to provide information to the software system, such as enabling a choice or providing information in answer to a particular question. The invention enables developers to specify a user interface or software interface using abstract interface objects that are independent of the specific concrete interface object that may be used when the specification is interpreted, for example when a servo is executed, in the context of a particular device or system.

Example abstract interface objects include, but are not limited to:

choice of 1 of n options
choice of m of n options
ability to specify a value for a specific instance of an object defined by schema, providing the current value as an option
progressive disclosure of means to specify information
a group consisting of other abstract interface objects Specification of an interface using abstract interface objects is preferred over concrete interface objects because it enhances the portability of the interface thus defined.

Specifying Views

Recall from the glossary that a view is essentially a selected grouping of transformation rules and components that define all or part of the interface for a servo. It is implemented by a view declaration. View declarations define how the application interacts with the user or another software component. See Appendix "A".

The declaration of views uses the XSLT vocabulary combined with extensions. The XSLT input trees correspond to declared data storage areas, and the output tree is a specification of the interactive user interface. XSLT provides a mostly declarative vocabulary for transformation. The invention allows the input tree to be modified as a consequence of transformation, as described in Specifying data modification. Use of the XSLT vocabulary does not imply a batch process for transformation. The invention uses the vocabulary to specify an interface that changes dynamically as the preconditions of transformation change. This process is described in the Interpreting servos section.

Example extensions include, but are not limited to the following elements, as illustrated in the schemas which accompany this document as Appendix "A":

the <view> element
use of variables, available to XPath, which identify input trees corresponding to storage declarations
an additional XPath axis providing access to schema information corresponding to the addressed data
an additional XPath axis providing access to origin and change history of the addressed data
an additional XPath axis providing access to opportunities (as defined below) associated with the addressed data Operation of such extension is described in the interpreting servos section.

Specifying Opportunities

Recall that an opportunity is an association between a unit of schema and a view that can provide a means to interact with, modify, or apply an operation to, an instance of that same schema. Opportunities thus allow servo authors to declare schema fragments for which the servo can provide alternative views or special actions.

For example, any number of applications can register the fact that they provide actions that can be performed on the address element of a particular schema. These actions might include indicating which side of the street the address is on, providing latitude/longitude coordinates for the address, providing driving directions from the current location, providing distance from current location, providing a map of the area, etc. These actions are available to users of applications that display data encoded in the target schema element. This is done both by allowing these templates or views to be called directly and by run-time discovery of options and display of those options to end-users of the servos.

Opportunities associated with objects are available to XPath expressions as functions and/or variables. This enables servo authors to discover opportunities at run time.

The invention can also be configured so that the declaration of an opportunity results in the opportunity being listed with certain abstract interface objects so that choices are presented to the user when the user is interacting with the object, regardless of what servo is being employed.

Operation of servos can be further illustrated with the following electronic commerce example. The kind of information that consumers may keep in databases managed by the invention can be extremely useful in predicting future purchases. For example, a list of "movies I want to see" can be interpreted as a list of "movies I want to buy." Any number of commerce servos can be introduced into a pre-existing set of servos, and be readily accessed from views of those servos by making use of opportunities declared by those servos.

Take for example a servo "A" that manages a personal library, and reading list. The schema for the personal library contains various views of book metadata which utilize a schema that includes a <book> element that has an ISBN attribute. A servo can be added which declares one or more opportunities associated with the <book> element, and offers a means to submit and track orders to one or more book suppliers. Additional servos can be added to track all outstanding orders and to provide status information from various carriers.

A servo can be used with a datasource that maintains user preferences and makes recommendations, such as is found at moviecritic.com or amazon.com. Such a servo can maintain a client side list of movie ratings that are reconciled with ratings found by crawling the site using the user's authentication credentials. When used in combination with servos oriented at purchasing or viewing products, the end-user is able to use multiple rating engines with the same set of ratings, and any set of purchasing servos. Thus, the invention can be used to help create electronic markets.

Other Types of Servo Declarations

Consistent with the presently preferred embodiment, operations that must be performed as a transaction are enclosed in transaction tags in the context in which they are defined. Operations not so grouped are processed individually. Transactions can be nested. Editing actions are specified using an XML vocabulary that covers operations that can be performed on an XML tree, such as the editing actions supported by the W3C Document Object Model.

Specify Access Control

The sample schema given in Appendix "A" provides an example of an access control model. The invention can be used with any number of access control models. Access control can be based on your role in a community, the specific data-types you are modifying, their context in the database and the control attributes on those objects or their closest container having such control attributes.

Structure of Databases Managed by the Invention

The preferred embodiment of the invention uses a native XML database with persistent, incrementally updated indices. Alternative database representations can include a simple XML file parsed and loaded at application startup, as well as a relational database.

The logical structure of the database is described here as if it were represented in XML, although other persistent representations are preferred, as explained above. Within each database are regions, which can contain, among other data:
  identification information for the database
  declarations identifying other databases
  servos installed in the database
  named storage regions associated with servos
  a transaction log with all changes encoded in XML, including the operations required to back out each transaction.

Example schema for a database is given in Appendix "A." This description applies to both local storage and server replica storage (see FIG. 3).

Process of Interpreting Servos

Servos are distributed on request or by pushing the servo definition into the offline store. The servos preferably are stored in parsed form. Alternatively, servos can be stored as unparsed XML. Alternatively, servos can be stored and distributed in a compiled form, such as would be used on a virtual machine, or actual machine code. Storing the servo as the data is stored enables the same tools to be used for storing, indexing, accessing, transporting, synchronizing and transforming the servos. However, compiled representations can be used to achieve better performance and/or smaller size. Byte code or machine code representations can also be translated on device from unparsed XML or parsed XML forms and cached locally to improve performance. The invention is described here in terms of the parsed representation option. The incremental interpretation process described below applies to XSLT transforms as well as servo definitions. The interpretation process requires first understanding the concept of "context" in greater detail.

Details of Context Content

Basically, an interpreter context is an object which encodes, through its own data and the objects it references, the internal state of the interpreter at a specific point of evaluation.

The component that performs the incremental transformation is called the transformer. The internal state of the transformer is organized into records, here called contexts. Each context specifies the evaluation state of the transformer at a specific point in the transformation process. Each context node can include at least the following content:
1. A pointer to an element within the servo template, XSLT stylesheet, or a node within an abstract syntax tree of an XPath expression contained in the transform. This serves as a program counter. This representation can be XSLT source, a parsed XSLT transform or a further compiled representation such as instructions in an XSLT virtual machine or hardware machine code.
2. A pointer that identifies the data context. It is a pointer into a source tree, or a result tree fragment.
3. An ordered list of zero or more contexts that provide a symbol space for the context. Intermediate contexts in the tree that do not introduce symbols may be skipped.
4. A reference to a parent context.
5. An ordered, potentially sparse, list of pointers to zero or more child contexts. In the preferred embodiment, these child contexts are contained in a data structure that encodes the relative order of materialized contexts, including the ability to encode unmaterialized regions of unknown size. An example of such a data structure is a b-tree in which materialized contexts and objects representing regions of unmaterialized contexts are maintained in order. This b-tree structure is further described below.
6. Definitions for symbols introduced by the context. Such symbols include variable declarations, parameter declarations, template declarations, view declarations, and data declarations. Contexts preferably encode the differences from the symbol context inherited from their parent(s). This includes declarations of variables and templates. Thus each context, through use of its parents, represents a complete XSLT processor state.
7. In the preferred embodiment of the invention, the transformer contexts also encode the current synchronization state.
8. Further, contexts can reference cache result trees, along with signatures of the types of changes that would invalidate the cached results. These result trees can represent components of a user interface.

b-Tree Structure and Spacer Operations

Unmaterialized regions can be of known length or unknown length. Unmaterialized regions of known length encode the length of the region as a count of missing contexts. This is called a spacer in the context of the execution tree. Unmaterialized regions of unknown length are distinctly marked and include an estimate of the number of missing contexts. When there is no basis for a better estimate, a predefined constant is used.

As mentioned earlier, a spacer can be used as a proxy for a plurality of contexts. There is an obvious savings from not creating context nodes that may never be needed. We leverage the b-tree structure to implement spacers. In a presently preferred configuration, we make use of the interior b-tree nodes, which are called interior whorls in FIG. 8, to stand in for the unmaterialized context or contexts. That's done within the interior socket structure as described with reference to FIG. 7, as part of an interior whorl, setting selected bits and, instead of having a pointer down to a context, use that same storage to indicate that the context is unmaterialized (which is to say it doesn't actually exist) and to indicate the number of unmaterialized objects that correspond to that object, as well as estimates for metrics such as the sum of Y span element (b) in FIG. 7.

Figure 9A:
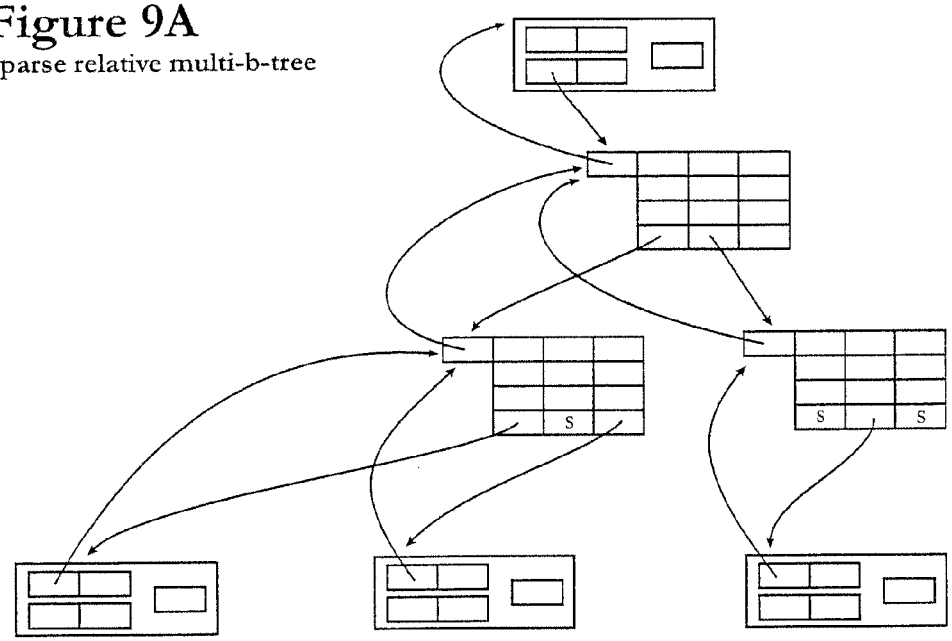
FIG. 9 is a simplified illustration of a single b-tree structure for use in constructing a context tree.
Figure 9B:
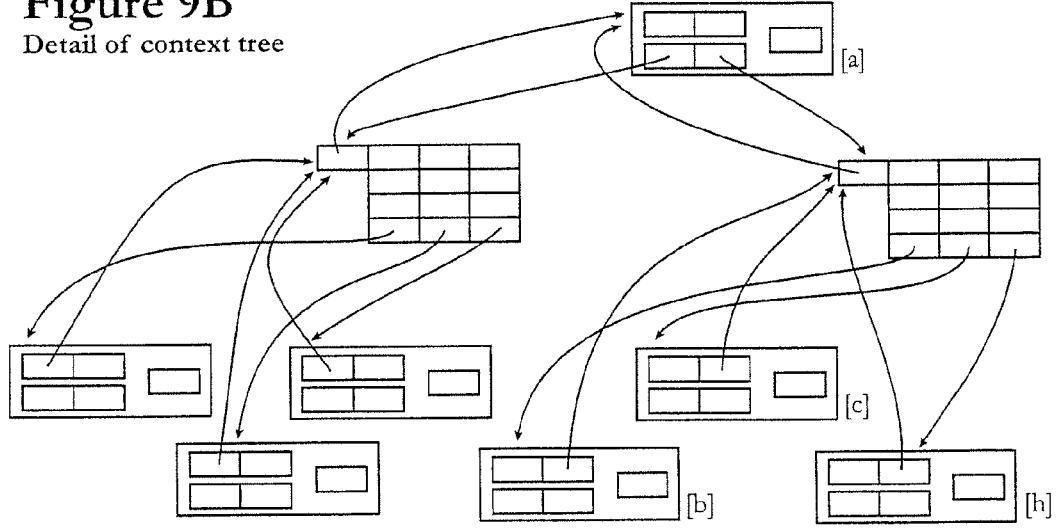

Also, at each level of the b-tree of FIG. 9, there are a set of flags which are used for a number of different purposes. Specifically, these can include flags that are searched for as part of the search criteria in the execution algorithm. Among them is a flag that indicates whether there is unmaterialized context (spacer) present. The search criteria of the algorithm can quickly investigate whether there is a context that needs processing, or it can search at the same time for unmaterialized contexts. (An unmaterialized context can be thought of as a context that needs a lot of processing. It doesn't even exist yet.)

When first processing an instruction that contains child instructions, an unmaterialized region (represented by a spacer) is created to correspond to all of the child instructions. Searching for unmaterialized regions is the primary mechanism that draws the process forward and causes new contexts to be created. Here the term "region" refers to a fragment of the geometry tree, corresponding to a region of user interface, for example a portion of a screen display.

Once an unmaterialized region is found that satisfies a given set of criteria, for example whether it is on-screen, the interpreter can "carve off" a piece, at one of the ends or in the middle, creating a new spacer or adjusting the existing spacer as required to accommodate a new context node.

In a presently preferred embodiment, the context tree is implemented using a relative b-tree configuration. FIG. 7 illustrates a single interior relative b-tree node entry. Each entry in the interior nodes of the b-tree contains a value that is the sum of the lengths (including materialized contexts, unmaterialized regions of known length and unmaterialized regions of estimated length), and a flag indicating whether estimated lengths were included in the sum. These values are paired with a pointer to the corresponding child node in the b-tree.

Referring to FIG. 7, the interior socket 700 includes (a) the sum of number of context node children, transitive over interior whorls, but not beyond the first level of context nodes. Second, element (b) contains the sum of y span, transitive over all levels below. The next element (c) comprises flags, including the union of all flags below. And finally, element (d) is a pointer to the child (context node or interior whorl) or cached information about unmaterialized object.

FIG. 8 illustrates an interior whorl of the b-tree 800. In this interior node, each column 802, 804, 806 defines an interior socket as described with reference to FIG. 7. FIG. 9 is an illustration of a portion of the interpretation tree. It includes a parent node 900 and plurality of child nodes, for example, 902 and 904. The relative b-tree implements interior sockets 910, 912 and 914. In this system, each Wt node can be parented separately by an interpretation parent and a geometric parent. In turn, each node can separately parent an interpretation tree and a geometry tree.

Additional fields can also be included in the b-tree node entries to track other linear values such as the y-axis of an image space that can be mapped to a graphical display. For example, this can correspond to the height of a PDA screen display. This data structure enables contexts to be materialized incrementally. Relative addressing can be performed in logarithmic time within spans of the tree that do not contain unmaterialized regions of unknown size by walking the tree structure in the usual manner of traversing a relative b-tree. Similarly, absolute addressing can be performed in logarithmic time up to the occurrence of the first unmaterialized region of unknown size. Estimates derived from this data structure can be used to satisfy scroll car sizing requirements of graphical user interfaces. In short, use of this data structure supports an incremental execution process that enables immediate output to the mobile (or local) user regardless of the actual database size.

Contexts are evaluated by performing the operation implied by the instruction addressed by the program counter and reflecting the result in a context. The details of the evaluation depend on the specific instruction. Evaluation actions include, but are not limited to the following:

Variable and parameter declarations introduce symbols
Literal elements copy themselves to the output tree
Concrete interface objects are passed on to the user interface subsystem Abstract interface objects are mapped to concrete interface objects using platform-specific rules Control constructs such as <xsl:if> determine which sub-trees are processed further.

Creating a spacer to correspond to all child instructions.

Several techniques can be used to encode the types of change that could require that a context be reprocessed. Some optimizing space, some optimizing the amount of unnecessary computation that is performed due to false positives.

A context may express dependency on instances of a specific schema component. For example, an interpreter context which references an XSLT statement including an XPath query that depends on the value of "y" attributes on "x" elements could register interest in any changes to values of "y" attributes on "x" elements (including the addition or deletion of "x" elements having "y" attributes).

Dependency on source trees can be generalized to an XPath expression identifying nodes whose change would require reprocessing. Such an expression can be derived from XPath expressions in the stylesheet element addressed by the program counter.

An interpreter context whose processing result depends only on its ancestors and the value of a single element or attribute instance can register an interest in that element or attribute instance.

All contexts express dependency on XSLT stylesheet content through their program counter.

Contexts are marked "unverified" when state they depend on has changed. When a context is marked unverified its ancestor contexts are flagged as having unverified contexts below. This can be used to rapidly search the context tree(s) from the root(s) for contexts that need to be reprocessed.

When an unverified context is selected for processing several techniques can be used:

The context can be evaluated, as if for the first time, in its current context. The result of the evaluation is then compared to the previous value.

The change log can be examined to determine the precise nature of the differences. In some cases (false positives) these differences can be determined to not affect the result.

The change log can be examined to determine a corresponding change to the output tree. For example, consider a query returning a somewhat different set of nodes. Nodes in only the new set must have corresponding contexts created. Nodes in only the old set must have their corresponding contexts deleted.

In each case, if the context has an identical effect to its previous evaluation, no changes need to be made to the output tree, and no child contexts need to be marked as unverified as a result of the evaluation. If the result of reprocessing is different than the previous processing, any child contexts that could be affected by the difference are marked unverified.

The choice of what context to process is driven by specific objectives of the software component requesting the transformation. These objectives can include:

The need to fill the visible portions of a formatting object with content.

The need to satisfy a request for data that is the object of a schema translation.

Processing to prepare the system to respond quickly to likely user action.

In order to effectively manage limited resources the processor can release contexts and associated fragments of the result tree. Release objectives can be set to work within a specific memory quota. The invention chooses contexts for release by scoring on the following criteria:

Contexts nearer the interior of the tree are preserved over contexts near the leaves of the context trees.

Contexts which required substantial computation on previous evaluation are preserved over contexts which required little computation.

Contexts which are responsible for less memory are favored over contexts which use more memory.

Contexts which carry decorations of the source or result trees are maintained as long as possible.

Other Features and Advantages of the Invention

The present system preferably validates data modification by rejecting editing transactions that violate data schema constraints. The entire effect of a transaction should be considered when validating schema constraints, although individual actions that make up a transaction need not yield valid intermediate results. In particular, the net result of a transaction must leave attribute values that match their declared type, and element structure that matches declared content models. The existence or absence of attributes should also be consistent with the corresponding element declarations.

The present system also rejects transactions that would violate access control constraints (described below) and transactions that would violate data mastering. And the present system ultimately rejects transactions that are rejected by the datasource that masters the data (described below). For maximum security, read and modification control are enforced by the mastering datasource. Modification control is enforced on the client and offline replicas as well as the server. By default, the database in which an object was created is the master for purposes of replication. This means that any modification that can be achieved through that creating database (subject to access control mechanisms) will be propagated to replicating databases as synchronization points with those databases occur.

The invention can be used in combination with encryption technology to provide private and authenticated access to remote datasources. For secure applications, the server preferably authenticates user identities when processing requests from client devices. User authentication is central to higher level security mechanisms such as access control and management of paid subscriptions.

Embodiments of the invention also can use digital signatures to ensure that servos delivered to a client device come from a trusted source. This model is similar to Microsoft's ActiveX control distribution model. A preferred implementation also provides robust access control mechanisms for users, content, and applications. Users can be given rights only to certain applications or certain data delivered to those applications. When a user registers for an application, his or her access rights are checked against the application's rights list that has been set up by the application's administrator. If the rights match, the user is allowed to install the application. Content can be given access control lists as well, enabling a single application to serve different levels of content to users with different access rights. For example, within a corporate environment, only the authorized accounting staff would have rights to see quarterly revenue figures before they were announced, but everyone could see historical figures that had been previously publicly announced.

Application Rights Arbitration: The client can be configured to provide a mechanism similar to the Java sandbox concept wherein the client enforces a set of rules governing what types of actions an application can take. Rules govern things such as writing data to the device's persistent storage, interacting with built-in applications, and requesting data from foreign servers. The user controls the settings for these rules. For instance, the user may allow any action to be taken by an authenticated application whereas tighter security might be applied to untrusted applications.

Content Authentication and Version Checking: In many business situations it is crucial to establish that information has not been tampered with and that all information components are of the right version. Consider, for example, the management of aircraft maintenance publications where it is required that all current service bulletins be displayed and that no un-approved documentation is displayed. The present system enables this to be accomplished through the synchronization processes by authenticating all messages through encryption, including messages which define configurations that are current as of a particular time.

Schema authentication and Version Checking: The invention can be deployed in an environment where servos come from a variety of sources. It is valuable in such cases to establish that new schema contributions come from authorized sources and that incompatible versions of schema components are not used together. Details of implementation will be apparent to those skilled in the art in view of this specification.

The server environment of the present invention also enables content and application providers to support subscription or pay-per-use distribution. Content providers might require a paid subscription to access their content. Thus, users' subscription status can be taken into account when checking access control. Content providers might also provide pay-per-use content. Embodiments of the invention can provide the infrastructure for collecting payment and ensuring that pay-per-use content is only delivered to paying consumers. Again, the particulars of implementation will be apparent to those skilled in the art in view of this specification and in any event will vary with the particular application.

User Management of Asynchronous Transactions: End-users can engage in asynchronous actions and can inspect the status of the task queue. The preferred embodiment includes user interface components that indicate when there are transactions in the following states:

Transactions that have not yet been communicated to the server or datasource.

Transactions that have been communicated to the server but for which no response has been received.

Transactions that have been confirmed by the server as having been successfully completed.

Transactions that have been rejected by the server but have not yet been viewed or acknowledged by the user.

Rejected transactions that have been viewed by the user but have not been acknowledged.

These interface components enable the user to quickly determine what tasks have been carried out or need to be attended to. In addition, the system can provide user interface components that enable users to initiate operations on transactions that are accessible through the interface described above. These actions include, but not limited to:

Viewing transactions in the context in which they were created

Canceling transactions

Modifying transactions that have not yet been communicated to the server and

Coping and modifying a rejected transaction to be resubmitted

Resource-Level Identity and Element-Level Identity

Embodiments of the present invention employ two kinds of identifiers: public identifiers and system identifiers. Public identifiers preferably are URLs for resources assigned through the authority of the registrar (330 in FIG. 3). System identifiers are UUIDs assigned without the assistance of any central authority when resources such as databases are created.

The invention implements a form of self identity as well as public identity because not all resources can be known to a public authority at all times. Take for example an environment in which the client has been distributed to a group of individuals without current network access. These individuals must be able to begin using the application right away. Using the application, however, can involve sharing information with others. The identity of this information needs to be tracked as it travels, so a unique identifier must be assigned. Since a central authority cannot be contacted to assign a public identity, the system must fall back on using self identity to track the information.

For reconciliation accuracy, performance and automation, units of information managed by the invention can be uniquely identified at a fine degree of granularity. Indeed, the reader will no doubt appreciate by now that the granularity is limited only as defined by the applicable data schema. Unique identifiers must be scoped in such a way that no global mechanism is necessarily required to dispense the identifiers. (Note however that a central authority could be used when available.)

Local and Global Identification with Short Forms

Recall that a "database name" is a string that can be used within one specific database as a short handle to another specific database. A short identifier is another term for a database name. The databases that the invention manages are identified using UUIDs.

Fully qualified global identification of an object is achieved by combining the identity of the creating database with a UID scoped to that particular database. When within their originating database, objects can be identified using a locally unique identifier. Within a specific database, other databases can be referenced using short identifiers which are scoped within the referencing database. Short identifiers can always be normalized to long forms to provide location independent identifiers.

In the sample embodiment, individual elements are identified with the "ts:u" attribute, which is an attribute defined on a "base" archetype that facilitates management of data. All element types that require generalized unique identification are below "base" in the implied inheritance graph. The value of the "ts:u" attribute consists of a database name followed by a local id, with a "#" separator. For example, in a database where "b" is a declared database name, an element with identify "2" scoped to within database "b" will have a "ts:u" attribute value of "b#2." Database names are declared with the <dbDecl> element in the sample schema found in Appendix A.

Elements which are not identified with the "ts:u" attribute are associated with the nearest ancestor that has a "ts:u" attribute. Such unidentified elements can be accessed with XML linking mechanisms. These pointers would be relative to the nearest ancestor with a "ts:u" attribute. UUIDs are encoded as a string of 32 hexadecimal digits with a dash delimiter ("-") after the 8th, 12th, 16th and 20th digits. For a full specification see the Distributed Computing Environment [DCE] specification. For example: "2fac1234-31f8-11b4-a222-08002b34c003" is a valid UUID.

In the sample embodiment, the UUID for a database is indicated by the "systemId" attribute on the first "ts:dbDecl" element. The UUIDs for other databases having elements replicated in this database are given as "ts:uu" attributes on the "ts:db" element under the "ts:imports" section. The local alias for each database is given as the "ts:localAlias" attribute of its "ts:db" tag. (See the schema in Appendix A.)

While it is possible to fully normalize all data represented in XML so that it is isomorphic to a normalized relational database representation, and while this is an appropriate encoding for many applications, the invention does not require that this be done with all data. This allows document-oriented characteristics to be provided by the invention. These characteristics include presentation order for elements and choice of primary location for multiply referenced objects.

Element Surrogates and Structural Referencing

It is also suggested that instances of the invention include an aliasing mechanism that allows the structure of cross-linked XML to be fairly thoroughly checked with existing XML tools and allows the structure of the database to be easily interpretable by humans. In the sample embodiment, the "base" archetype includes an "ts:aliasOf" attribute of type IDREF which can be used to reference an element of the same type whose attributes and content serve as the attributes and content for the referencing element. Most processing utilities operate above the level where knowledge of these aliases is necessary. Lower level utilities expand these aliases as an automatic service.

This same reference mechanism can be the basis for element instance inheritance. This provides a means to extend data replicated from others while minimizing resolution conflicts. Low-level utilities interpret inheritance automatically. Transformers to expand aliases can be used to simplify operations for downstream transformers. When aliases have been expanded it is possible to discover the original source of the information by examining special system maintained attributes or alternative XPath axes.

Since aliases can in turn reference other aliases, information can be added at each level. Any number of subtrees can contribute to the final value of an alias chain. Since multiple transformations can be composed together it would not be uncommon for multiple instances of the same record to turn up at some phase of the transformation process when only a single instance is required. The "ts:u" attributes described above are the primary mechanism for identifying copies and eliminating duplicates when that is appropriate. By default, when an alias is expanded, the resulting element acquires the "ts:u" attribute of the referenced element. This is the appropriate action when the alias exists to facilitate a tree-oriented view of non-normalized data.

In the sample embodiment, the "base" archetype includes a "refPath" attribute of type IDREFS. When an alias is expanded, the value of the "ts:u" attribute of the referencing element is appended to the list. In the sample embodiment the "base" archetype further includes an "inhPath" attribute of type IDREFS. When an ancestor is processed that contributes attributes (other than "refPath") or content to the expanded value, the value of the "ts:u" attribute of the ancestor is appended to the list. The values of certain attributes can apply to an arbitrary amount of information which may be grouped together in a subtree. Attribute inheritance may or may not follow aliases. Whether or not it follows is a choice of extended schema and/or application design. When possible, personalization should occur through refinement (e.g., via inheritance) rather than through making individualized changes to replicated data.

Managing Change

Recall that changes to data are the subject of messages between client and server, as illustrated in FIG. 3. Editing actions are specified in terms of operations on an abstract XML model. For example, operations as described in DOM. The invention creates logs of changes as they occur. Edits are placed in the log prior to being performed. This is called an edit log or transaction log.

A sample syntax for communicating change information is provided as part of Appendix A. In particular, <syncRequest> messages are requests for updates to a particular piece (or pieces) of replicated data. Information in a syncRequest may include:

The "ts:u" attribute values (discussed above) of the root nodes of the subtrees requesting an update. This information is required for every Sync Request.

The Sync Packet Id of the last committed Sync Packet. This Id contains the sequence number or date/time value of the last committed Sync Packet. This is to request edits that have occurred since this synchronization. In the absence of this attribute, it is assumed that the first Sync Packet in the edit log is the starting point.

The Sync Packet Id of the last Sync Packet desired. This is an optional attribute.

The document identifier for the document we are requesting edits to. In the absence of this attribute, we assume that the request is for edits to the local document.

Whether the document identifier is a public Id or a UUID. This is basic typing information needed to resolve the document identifier attribute.

A collection of "ts:u" attributes of subtree elements we wish to exclude from the request. This is optional.

To support tracking changes in collaborative authoring contexts, the "ts:cre" attribute encodes the creation date/time of an instance of an element derived from the "base" archetype. The "ts:mod" attribute encodes the modification date/time. Modification is defined as a change to attributes (other than "ts:u"), the generic identifier, the order or existence of immediate children, and change to any children not enclosed in one or more elements derived from the "base" archetype. Changes to the "ts:mod" attribute are not themselves considered changes (this rule may have no consequences since modification does not propagate beyond the first ancestor element derived from the "base" archetype).

The "ts:cre" and "ts:mod" attribute values are based on system clocks and cannot be trusted as the basis for synchronization, which brings us to synchronization points, described next.

Synchronization Points

We define a "synchronization point" as an event during which a database incorporates information from another database, thus instigating replication or updating previously replicated information. Each database has its own linear address space of synchronization points, preferably represented as strings of decimal digits. Every database will maintain a record of at least the latest synchronization point with every database from which it imports replicated information. Every database will maintain a record of at least all synchronization points at which information may have been replicated out.

While it would be useful to keep specific bidirectional records of all synchronization points, this record keeping may be impractical for certain databases, for example, a database which serves as a template for a large number of other databases or a database on read-only media. Even if this information is always kept, the system must be constructed so as to recover transparently when such export information is lost. In a presently preferred implementation, databases are not required to keep a record of all databases which have received information replicated from them. Not keeping usage (reference) counts with transactional integrity implies a need for a distributed garbage collection solution. Otherwise, one may not know how long to keep synchronization packets. The server environment should provide a mechanism for distributed garbage collection. This must not interfere with the moment-to-moment operation of the system at any time.

In our sample schema, the "ts:sy" attribute carries the synchronization point identifier of the first sequence point following the element's creation or modification. Modification is defined as in the definition of the "ts:mod" attribute. The "ts:sy" attribute is found on the "base" archetype. The type of the value of the "ts:sy" attribute is a string representation of an integer. The "ts:db" elements under the "synchronization" element in the "context" section hold the synchronization point log for each database. See the schema of Appendix "A" for details.

Scope of replication can be controlled as well. A database can explicitly disallow specific data from being replicated outward. A database can explicitly disallow specific data from being replicated transitively (i.e., more than one level). Since it is easy to copy data, constraints on replication and transitive replication are not strong security measures. They are more a way of indicating, in an advisory manner, how the originator of the data wants the data to be handled. Control parameters apply to the transitive closure of a subtree through containment, but not through aliasing or other linking mechanisms. This is a case where the physical structure of the database dictates control semantics. Items referenced in the structure are not necessarily protected by protection of the structure.

Copies created using the services of the present invention preferably carry a copy attribute that indicates the identity of the originating element. The syntax of the copy attribute values is identical to that of the "ts:u" attribute value described above. When a subtree is copied, a copy attribute is applied to each element deriving from the "base" archetype, identifying its corresponding source. Changes from other datasources are captured using one of a variety of techniques. Examples are:

Tracking change during modification in the manner of the invention
    Comparison of backing store
    Query based on modification stamp.
    Use of database logging facilities.

The present invention also very effectively addresses (data) schema incompatibilities. A "schema translator" is a software component that converts data of one specific schema to data of another specific schema. Each version of each schema component preferably has a public identifier. One or more schema translators can be associated with a directed pair of schema component public identifiers. A flag for each registered transformer indicates whether the transformation involves a loss of data. Transformer pairs that have been successfully reviewed and tested for lossless round trip are registered as such. "Registered" alludes to the registrar described above with reference to FIG. 3 and further described below. Each version of each application registers the schema components it depends upon.

Consistent with the present invention, client-client, client-server and server-server interactions are all mediated by XML based messaging. (Alternative encodings can be used when both parties can handle them.) Standard encryption and authentication methods can and should be used to manage these messages. The invention relies on XML and transmission of other file types. This messaging can be accomplished using a wide variety of transmission techniques, including but not limited to the following protocols, technologies and standards, individually or in combination:

TCP/IP
    Hypertext Transport Protocol (http)
    Secure Hypertext Transport Protocol (https)
    SOAP
    E-mail
    Secure Socket Layer (SSL)
    Short Message Service (SMS)
    Cellular Digital Packet Data (CDPD)
    GSM
    GPRS The server environment described above preferably also includes an incident reporting service. This is a service that tracks subscriptions to events associated with particular resources, and informs subscribers when those events occur. Services of this type are used most commonly to track dependencies between source databases and databases which replicate parts of the source databases.

The incident reporting service manages relationships among resources known to the system of the present invention. Database representations of these relationships are generally redundant, in that the receiving database knows about its relationship with the originating database. (The originating database may also know about the receiving database.) In other words, database relationships are peer to peer, but the incident reporting service facilitates communication between peers which may not be active at the same time. The purpose of the incident reporting service is to facilitate the timely update of databases, but it has no responsibility for actually scheduling tasks. Clients of the messaging service can use the incident reporting service as a sort of "group" mechanism: messages sent to the incident reporting service referencing a resource are can be forwarded to each of the subscribers to that resource.

Another component of the server environment in a preferred embodiment is a task allocator (not shown). This is a service that assigns interactive tasks to available computational resources based on suitability to purpose (server load, access to resources, availability of cached database or session state). The allocator depends upon the location broker to identify the location of resources and the performance monitor to determine the load on each of the relevant resources.

Another component of the server environment in a preferred embodiment is a task scheduler (not shown). This is a component that assigns computational tasks to available computational resources based on priority, aging, deadlines, load, etc. Typically the tasks handled in this manner are not in response to a current user request. In order to deliver optimal performance in response to user requests, the invention makes provision for accomplishing preparatory tasks in the background on a time available basis. Tasks likely managed in this way by the scheduler include, but are not limited to:

synchronizing databases
    creating usage reports
    optimizing databases
    garbage collection of unneeded synchronization packets
    crawling personalized web sites The task scheduler depends upon the task allocator to actually allocate tasks.

The location broker is component of the invention that can accept an identifier for a resource and provide means to contact that resource. Resources are not necessarily local to the broker.

A directory of services is a location broker that provides a navigable index of available services. Location broker services are needed to find database resources in the computing environment of the invention, where resources are distributed and location is subject to change.

Given a public identifier or system identifier the location broker provides access to the resource. In the simplest case, the location broker will satisfy a request by posting the URL given in the public identifier. This a degenerate case above which the location broker can add value. For example, the location broker can cache responses.

Registrar

The registrar, as mentioned above, manages metadata to enable the invention's distributed deployment. Data associations managed by the registrar include, but are not limited to:
 schema public identifiers with schema representation
 schema translators with directed pairs of schema public identifiers, including flag for whether translation loses information
 datasource public identifier with datasource declaration
 servo public identifier with servo declaration
 each servo public identifier with the public identifiers of the schemas it uses
 each servo public identifier with the public identifiers referencing schema referenced in the opportunity declarations of the servo The registrar provides mappings across these associations use standard database techniques. In addition, the registrar calculates best translation path (if any) between any two schema public identifiers using standard graph analysis algorithms.

Synchronizer

The synchronizer (310, 326 in FIG. 3) is a component that uses transaction records, synchronization point identifiers, time stamps, datasource declarations and database instance-specific parameters to maintain correct database state across a set of related databases managed by the invention. The synchronization point identifier is an identifier uniquely representing a synchronization point for a particular database. Recall a synchronization point is the event during which a database incorporates information from another database, thus instigating replication or updating previously replicated information.

The synchronizer is responsible for generating and processing the synchronization packets that mediate the propagation of change among components of the invention. Data source declarations influence the timing of synchronization by indicating when and how quickly data becomes obsolete. Time stamps are relevant when time-dependent data such as stock quotes need to be reconciled.

Coordinating XML Stores

The invention's default approach for distributed lock management is optimistic but centralized (on a per-resource basis). Authority to attempt change is given by the datasource declaration. Change is implemented through one or more protocols published with the datasource declaration. These protocols can be classified as either low-level "data oriented" XML modification protocols, such as TSXUL, or higher-level "object oriented" actions which can be schema specific.

There are several levels at which a change can fail:
 Data source does not accept changes: The datasource may choose not publish a protocol for accepting changes. Such a datasource is effectively read-only.
 Individual requesting change does not have authority to make changes (at all) to the data. This is commonly called resource-level access control.
 Individual requesting change does not have authority to make the specific changes (e.g., some fields are editable, some are not). In such a case, specification of what can be changed should be made available as part of the change protocol so that upstream clients don't lead individuals to attempt changes which will ultimately fail.
 An individual's changes conflict with other changes made since the conflicting sources have a common baseline. For example, two people change the same text field.

The invention attempts to detect these issues as far upstream as possible, but the datasource itself must do it's own checking.

There are a number of ways a client can deal with "rejected" changes. The last two in the list below are used by the preferred embodiment of the invention.
 Transaction managed client aborts transaction, changes never committed.
 Client does not apply actual change to its store before submitting the request. The requested modification continues to have unofficial status (e.g., modified data in a form).
 Client has already implemented update but applies "undo" info saved as part of synchronization point.
 Client receives update synchronization packets as response, updates, shows user conflicting information, provides opportunity to retry.

Replication of data must be carefully managed as well. In accordance with the invention, a transient database is used, i.e., a database that exists only for the purpose of messaging.

Databases that are created only for the purpose of transmitting data are transient: they need not have public IDs because it is not always required for them to be publicly addressable. They do have system IDs. Whenever data is replicated the root element(s) of the replicated data carry a master" attribute which contains the local alias of the master. Even when new elements are created in subtrees that are mastered elsewhere, they are give "ts:u" identifiers as mentioned above for the database in which they are created. In situations where a client that is originating edits is in direct communication with the master, the "ts:u" attributes can be normalized to new identifiers scoped to the master. This is useful in situations where it is important to protect the privacy of the originator of the data. It also reduces the number of database declarations that need to be created in context/imports.

Managing Dependencies Among Applications and Schema Components

Applications and their underlying schema are expected to change over time. New capabilities are added, ambiguities are fixed and sometimes applications are simplified. Since multiple applications may be depending on different versions of the same schema, the invention must employ the schema translation infrastructure to keep everything working through a transition.

The invention's ability to manage schema and schema translation means that new schema need never be forced on users unless they want capability enabled by the new schema, or enabled by applications that work only with the new schema. Each database automatically maintains lists of imported (used) schemas. (Automatic tracking for the dependencies that instance data has on schema).

The scheduling capabilities of the server environment are used to identify and applications requiring update and taking them through the needed transformations in a timely manner.

Managing Schema Registered with the Invention

To fully benefit from the integration made possible by the invention some human coordination is valuable. On their own, different application developers will extend the base schema in multiple incompatible ways. To see how this works in practice, consider the hobby of collecting. There are some shared characteristics for how collectors operate, but the objects collected are diverse, as are the sources of information. Everyone involved in stamp collecting needs a common way to describe the artifacts. Individuals and vendors need a way to document their holdings, offer items for sale and identify items available for purchase from others. Information about individual artifacts and issues can come from publications, news groups, clubs, commercial websites and websites of issuing governments. Many of these parties have reason to have an interest in having their information accessible in a public deployment of the invention, if the environment has already been well seeded and it is reasonably easy or them to make the necessary extensions.

All that is fine until different people begin extending the system in mutually incompatible ways. For example, two different parties might extend the schema in different ways to cover the same missing data, say the name of the designer of a stamp. Now there are some views that expect the designer of a stamp to be encoded one way, and some views that expect it to be encoded another way. Neither set of views will be able to show data that is in the encoding expected by the other. Reconciling these differences requires human intervention to establish a standard schema, map the variant schemas to the standard schema, and transform the views accordingly. The role of "schema editor" is a service that keeps the system running smoothly by arbitrating the preferred schema. Third party schema developers can create, using the invention, the transformers that translate instances between schemas. Throughout this process, each variant of a schema can registered and authenticated through the processes described above.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A distributed mobile computing system for intermittently networked devices, the system comprising:
   a servo for execution on a mobile computing device having a user interface and having at least intermittent communication with a server environment, the execution of the servo to realize a predetermined function on the mobile computing device, the servo defined in a predetermined servo description language (SDL) and configured to be stored in local storage on the mobile computing device, the servo comprising:
      a declaration of data storage on the mobile computing device, the declaration including or referencing a schema, and
      a declaration of a view, the declaration including a transformation rule mapping a schema component to an abstract interface object or concrete interface object;
   an interpreter to execute the servo on the mobile computing device to realize the predetermined function by interacting with data and schema in local storage and interacting with a concrete interface object or an abstract interface object to enforce the mapping declared in the transformation rule of the servo;
   a synchronizer on the mobile computing device to interact with a server-side synchronizer to synchronize data, schemata, and servos stored in local storage of the mobile computing device with server-side replica storage during periods of network connectivity; and
   a server environment including:
      storage on a non-transitory computer-readable storage medium for data, schemata, and at least one servo;
      replica storage of the local storage on the mobile computing device, wherein the replica storage is on a non-transitory computer-readable storage medium; and
      a synchronizer to interact with the synchronizer on the mobile computing device to synchronize data, schemata, and servos stored in local storage of the mobile computing device with the replica storage.

2. A distributed mobile computing system according to claim 1, wherein the servo is declared using a standard XSLT vocabulary extended so as to include the view declaration element.

3. A distributed mobile computing system according to claim 1, wherein the servo further includes one or more elements that include the declaration of data storage on the mobile computing device, and wherein the declaration of data storage includes a declaration of a persistent storage tree.

4. A distributed mobile computing system according to claim 3, wherein the declaration of data storage on the mobile computing device includes a name attribute for defining a locally scoped name for the corresponding storage tree.

5. A distributed mobile computing system according to claim 4, wherein the declaration of data storage on the mobile computing device includes identification of a predetermined storage schema to which the corresponding storage tree conforms.

6. A distributed mobile computing system according to claim 5, wherein the declaration of data storage on the mobile computing device includes at least one attribute directed to specification of a lifetime, an update policy or a destruction policy associated with the corresponding storage tree.

7. A distributed mobile computing system according to claim 5, wherein the predetermined storage schema is defined in an extensible markup language (XML).

8. A distributed mobile computing system according to claim 5, wherein the predetermined storage schema is defined within the servo.

9. A distributed mobile computing system according to claim 5, wherein the predetermined storage schema is defined by an XML schema definition.

10. A distributed mobile computing system according to claim 5, including an opportunity element to realize automatic extension of the servo through opportunity-based linking of an interface component representing an instance of a schema fragment to a template wherein the template specifies at least one of a transformation rule, a transaction handling rule and an interface object specification.

11. A distributed mobile computing system according to claim 5, wherein the servo is declared using a standard XSLT vocabulary extended so as to include the declaration of data storage on the mobile computing device.

12. A computing platform for distributed mobile applications comprising a computer-implemented server environment for interaction with a mobile client machine over a potentially intermittent communication channel, the server environment including:
- a messaging service for managing potentially intermittent communication between the client machine and the server environment;
- a location broker component for locating a database associated with an identifier contained in a request communicated from the client machine;
- a session manager service for managing an interactive session with the client machine;
- an interpreter instance for processing a request assigned to it in a current session;
- storage on a non-transitory computer-readable storage medium for at least one servo, data and schema;
- replica storage of a local storage on the client machine, wherein the replica storage is on a non-transitory computer-readable storage medium, and wherein data and schema in the local storage on the client machine are used and manipulated by an interpreter on the client machine that executes a servo to realize a predetermined function;
- a synchronizer to interact with a synchronizer on the client machine to synchronize data, schemata, and servos stored in local storage of the client machine with the replica storage; and
- a registry for managing meta data associated with servos and schemata;
- wherein both the servo and the data are expressed in a markup language.

13. A computing platform according to claim 12 wherein the stored servo is declared in a servo definition language (SDL) defined by a schema that references the XSL vocabulary; and the SDL includes a means for discovering a session environment; and
- wherein the session environment includes indicia (attributes) of a physical location of the mobile client machine, identification of the mobile client hardware, and current status of the communication channel.

14. A computing platform according to claim 12 wherein the SDL defines a storage declaration instruction, and application data is available for reference in the SDL as a named input tree using a name defined in a storage declaration instruction in the servo.

15. A computing platform according to claim 14 wherein the SDL defines the following types of rules:
- application data schema;
- transformation rules;
- transaction handling rules; and
- interface object specifications.

16. A computing platform according to claim 15 wherein the SDL further defines opportunity rules to realize automatic extension a servo through opportunity-based linking of an interface component representing an instance of a schema fragment to a template.

17. A computing platform according to claim 15 wherein the SDL further defines opportunity rules to realize automatic integration of multiple servos through opportunity-based linking of an interface component representing an instance of a schema fragment to a template.

18. A computing platform according to claim 16 wherein the SDL specifies at least one of a transformation rule, a transaction handling rule and an interface object specification.

19. A computing platform according to claim 16 wherein the SDL further includes a view element for selecting a group of transformation rules to define at least a part of an output interface.

20. A computing platform according to claim 19 wherein the server environment further includes a schema translator for translating data from one schema to another.

21. A computing platform according to claim 19 wherein the registry includes at least one of the following kinds of metadata:
- a schema public identifier with the corresponding schema representation;
- a schema translator with a corresponding directed pair of schema public identifiers including flags for whether the translation loses information; and
- a datasource public identifier with corresponding datasource declaration.

* * * * *